(12) United States Patent
Drouin et al.

(10) Patent No.: US 7,483,338 B2
(45) Date of Patent: Jan. 27, 2009

(54) ULTRASONIC LOCATOR SYSTEM AND METHOD

(75) Inventors: Guy Drouin, Neufchatel (CA);
Jean-Marc Piuze, Val Belair (CA);
Frederic Landry, St-Emile (CA)

(73) Assignee: Gencsus, Schenectady, NY (US)

( * ) Notice: Subject to any disclaimer, the term of this patent is extended or adjusted under 35 U.S.C. 154(b) by 1042 days.

(21) Appl. No.: 10/733,439

(22) Filed: Dec. 12, 2003

(65) Prior Publication Data

US 2005/0128099 A1    Jun. 16, 2005

(51) Int. Cl.
*H04B 1/02*    (2006.01)
(52) U.S. Cl. .................... 367/137; 340/825.49
(58) Field of Classification Search ........... 367/137; 340/825.49
See application file for complete search history.

(56) References Cited

U.S. PATENT DOCUMENTS

| | | | |
|---|---|---|---|
| 3,439,320 A | 4/1969 | Ward | 340/16 |
| 3,805,265 A | 4/1974 | Lester | 343/6.5 |
| 4,227,259 A * | 10/1980 | Mogi | 455/352 |
| 4,314,365 A * | 2/1982 | Petersen et al. | 367/82 |
| 4,602,256 A * | 7/1986 | Kago et al. | 340/539.1 |
| 5,027,314 A | 6/1991 | Linwood et al. | 364/900 |
| 5,341,167 A * | 8/1994 | Guichard et al. | 348/14.05 |
| 5,572,195 A | 11/1996 | Heller et al. | 340/825.35 |
| 6,104,295 A | 8/2000 | Gaisser et al. | 340/573.4 |

* cited by examiner

*Primary Examiner*—Ian J Lobo
(74) *Attorney, Agent, or Firm*—Baker & Hostetler LLP

(57) ABSTRACT

An ultrasonic transmitter system(s) and method(s) are described having location and tracking capabilities. The transmitter's, by using ultra sound and encoded micro-modulation, are able to provide enhanced longevity and reliability. A maze algorithm is devised that further provides discrimination of false detections, versus true detections, and no detection.

15 Claims, 6 Drawing Sheets

ULTRASONIC LOCATOR SYSTEM AND METHOD

FIELD OF THE INVENTION

The present invention relates generally to locator systems. More particularly, the present invention relates to a locator system and method using ultrasonic signals.

BACKGROUND OF THE INVENTION

Personnel or asset location systems are routinely used in manufacturing and hospital environments. However, with increasing concerns for security and inventory control, such systems have progressed beyond typical manufacturing and hospital environments to other areas such as, for example, government and corporate environments.

In order to provide accurate location of the tracked object, a transmitter is commonly attached to the object. The transmitter stores information regarding the object's characteristic and routinely, or upon prompting, using various transmission methodologies transmits, for example, radio, ultrasonic, or optical signals to various receivers located within the tracking environment. Based on either time-difference of arrival information or other methods a locator system can be developed. However, problems with reliability, power consumption, signal interference, and the like have plagued conventional systems.

For example, location systems using radio frequency transmitters are described in U.S. Pat. No. 6,104,295 by Gaisser et al., for tracking of hospital patients. The Gaisser system has the disadvantage that it requires, in addition to the radio frequency (RF) signal, an infrared signal to accurately locate objects within the tracking environment. Also, RF waves are very directional and in steel buildings require multiple receivers due to reflections and ghosting. Also radio frequency signals are easily contaminated with ambient electronic noise such as motors starting, fluorescent lights, computers, and low power communication systems.

U.S. Pat. No. 5,027,314 to Linwood et al. discloses a tracking system using a light based transmitter, and U.S. Pat. No. 5,572,195 to Heller et al. uses light, such as infrared transmitted signals, to determine the location of a tracked object. However, infrared based location systems suffer from narrow beam widths and beam blockage. Also, infrared radiation is known to go through glass windows and, therefore, transmitters using infrared radiation can "leak" into other rooms or locations resulting in false locations.

U.S. Pat. No. 3,439,320 to Ward describes a personnel location system using ultrasonic transducers using unique frequencies to identify the tracked person. U.S. Pat. No. 3,805,265 to Lester discloses a location system using any one of radiant waves such as light waves, acoustic waves, ultrasonic waves, or microwaves, which are carried and transmitted from a central console to track a particular person. However, Lester describes a chained network of transducers conveying location signals from one cell to the next to arrive at the central console. Multiple frequencies are used to distinguish each transmitter from member transmitters, the transmitters acting as transceivers for each link in the chain.

Despite the various methods used above for tracking or locating objects within an environment, each of the above systems suffer from disadvantages such as for example, an excessive size, short battery life, interference, mislocation, and/or false location reads. Therefore, there has been a long standing need in the tracking field for a locating system that at least to some extent overcomes the limitations described above.

SUMMARY OF THE INVENTION

The foregoing needs are met, to a great extent, by the present invention, wherein in one aspect an apparatus is provided where in some embodiments an ultrasonic transmitter based location system and/or method is provided.

In accordance with one embodiment of the present invention, an ultrasonic transmitter is provided, comprising a transmitter power source, an ultrasonic frequency oscillator, a microcontroller assembly having an encoder capable of encoding a predetermined value, a serializer capable of serializing the encoded value, a micro-modulator capable of micro-modulating an ultrasonic frequency of the oscillator with the serialized encoded value and, an ultrasonic transducer capable of transmitting a micro-modulated ultrasonic signal.

In accordance with another embodiment of the present invention, an ultrasonic locator system is provided, comprising a transmitter power source, an ultrasonic frequency oscillator, a microcontroller assembly having an encoder capable of encoding a predetermined value, a serializer capable of serializing the encoded value, a micro-modulator capable of micro-modulating an ultrasonic frequency of the oscillator with the serialized encoded value and, an ultrasonic transducer capable of transmitting a micro-modulated ultrasonic signal.

In accordance with yet another embodiment of the present invention a method for ultrasonic based location detection is provided, comprising the steps of, transmitting a binary encoded value as a micro-modulated frequency shifted ultrasonic signal, detecting the ultrasonic signal with location specific ultrasonic receivers, de-micro-modulating the detected signal, validating the encoded value, passing the validated value to a controller, and determining a location of the transmitter based on the location of the receiving receiver.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
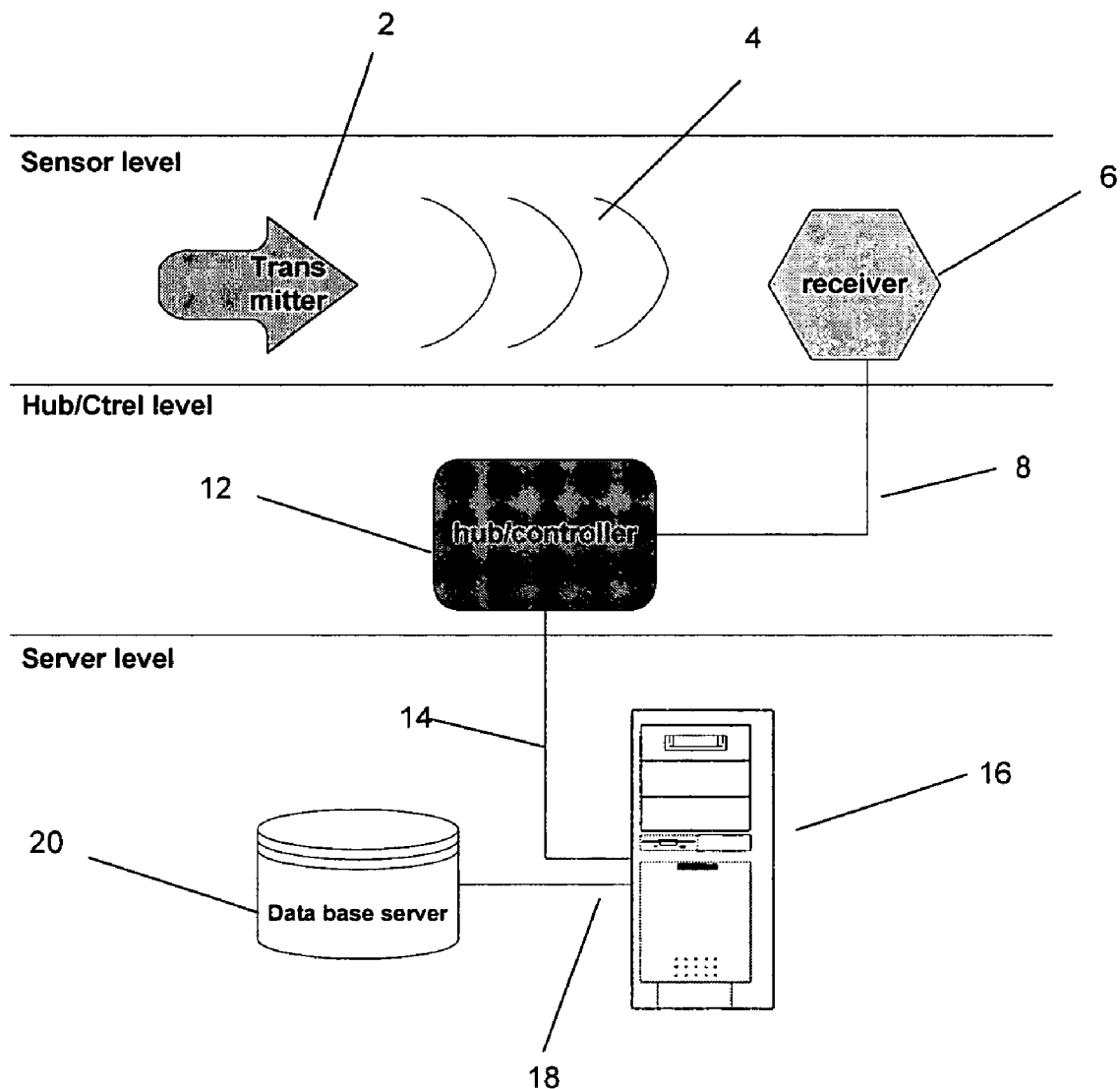
FIG. 1 is block diagram of an exemplary locating system according to a preferred embodiments of the invention.

The invention provides an ultrasonic locator system and method. Preferred embodiments will now be described with reference to the drawing figures, in which like reference numerals refer to like parts throughout.

Ultrasound can be used as a signaling medium between a mobile transmitting device and a known receiving location. Since ultrasound travels at the speed of sound it is less difficult to take measurement of the distance traveled as compared to light. For example, in air at 20° C., normal atmospheric pressure (sea level), sound is known to travel at about 343 meters per second (approximately 1125 feet per second). Accordingly, the ultrasound wave travels at about 2.5 centimeters for every 73 microseconds, which is a time interval that is easily managed by the clock speed of conventional processing systems.

Ultrasound is also known to be bounded by floor and ceiling structures, and does not easily penetrate glass. Thus, ultrasound waves offers a reliable means of limiting ultrasound signals within a single room without the typical locating and tracking errors inherent in RF and IR, as discussed above.

In order for any locating/tracking system to operate with a high degree of reliability, several factors must be taken into account. For example, from an understanding of the characteristics of the "object" being located, the characteristics of the environment that the object is in and the time relationships inherent in the system, physical limitations in the ability of the objects to move within the environment can be determined. A locating/tracking system that recognizes these limitations and yet provides a high degree of reliability and cost effectiveness is described herein.

FIG. 1 is a block diagram illustrating an exemplary locating system 10. The exemplary locating system 10 is described with three levels: a sensor level, a hub/controller level and a server level. The top most layer (sensor level) contains a single ultrasonic transmitter 2, which transmits an ultrasonic signal 4 that is detected and received by an ultrasonic receiver 6. It should be apparent that while FIG. 1 only illustrates one transmitter 2, more than one transmitter 2 may be used in the sensor level. The ultrasonic receiver 6 decodes the ultrasonic signal and forwards the signal information to a hub/controller 12 in the hub/controller level via a receiver-hub/controller link 8. The hub/controller 12 provides multiplexing, processing and other data and command coordination as needed and forwards the received signal to a processing unit 16 in the server level via a link 14. The processing unit 16 coordinates data and command exchange and storage with a database server 20, via link 18.

In operation, when the receiver 6 receives an ultrasonic transmitted signal from the transmitter 2, it validates the coding within the signal and rejects invalid transmissions that may be caused by noise and/or reflections for example. When the transmission is determined to be of valid transmitter ID, the receiver 6 stores it in its local memory until it is forwarded to the hub/controller 12 and is periodically or aperiodically conveyed to the processing unit 16 for comparison, processing, or storing in the database server 20. Based on the results or conditions on which the information is retrieved by the hub/controller 12, the information maybe immediately processed or forwarded to the database server 20.

Figure 2:
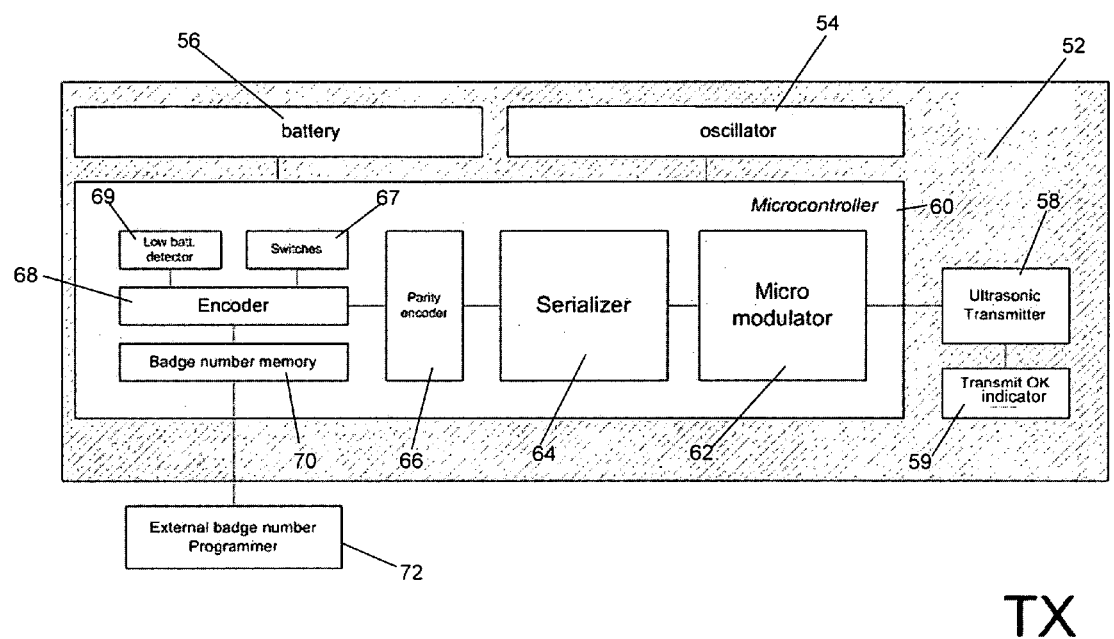
FIG. 2 is a block diagram of an exemplary transmitter.

FIG. 2 is a block diagram of an exemplary transmitter 50 suitable for use in the exemplary system 10 depicted in FIG. 1. The exemplary transmitter 50 is capable of functioning as an electronic badge and comprises a transmitter housing 52, an oscillator 54, battery 56, an ultrasonic transmitter 58, a transmit indicator 59, and a microcontroller module 60. The housing 52 facilitates the battery 54 which supplies power to the microcontroller 56 and various other components of the system, as needed. The microcontroller 60 contains a micromodulator 62 which modulates bits forwarded to it by a serializer 64. The serializer 64 receives a train of bits from the parity encoder 66 which, in turn, receives encoded bits from the encoder 68. Call buttons 67 are shown as connecting to the encoder 68 for manual configuration or specialized calls. A low battery detector 69 is also provided to enable specialized encoding to indicate a low battery condition. The encoder 68 encodes the badge number provided by the badge number memory 70. The badge number memory 70 is programmable via an external badge number programmer 72.

In operation, the exemplary transmitter 50 is programmed with a badge number designated for this badge/transmitter 50, by using the external badge number programmer 72. The badge number memory 70 may be any one of innumerable data storage systems that transfers data or operates as a memory storage mechanism. Such mechanisms may include, and are not limited to, EPROM, EEPROM, DRAM, SRAM, Flash, Bubble, etc.

The designated badge number stored in the badge number memory 70 is read by the encoder 68. The encoder 68 encodes the designated badge number, as well as provides encoding for a low battery condition as signaled by the low battery indicator 69. Additionally, the encoder 68 can be "switched" into different modes according to the settings of the switches 67. The encoded badge number is forwarded to the parity encoder 66 wherein the parity encoder 66 inserts parity checksum bit(s) into the encoded badge number. The parity encoded badge number is thereafter serialized or formatted into a serial format by the serializer 64. The serialized bits are forwarded to the micromodulator 60 which are modulated using the oscillator 54 as a frequency source to generate a frequency shifted electrical signal which is fed to the ultrasonic transmitter 58 for transmission.

While FIG. 2 illustrates the makeup of the transmitter or badge 50 as having the specific components arranged in a specified manner, it should be apparent to one of ordinary skill in the art that the transmitter 50 may be modified to provide additional features or reduced features, according to design objectives. For example, the oscillator 54 is shown as being a separate component as compared to the microcontroller 60. Obviously depending on the design of the microcontroller 60, the oscillator 54 may be provided as an integrated component of the microcontroller 60. Other modifications, such as the incorporation of a microprocessor or a signal processor may be contemplated to provide additional features. Further, it should be appreciated that rearrangement, reduction, parallelization, etc., of the various components of the exemplary transmitter 50 may be contemplated by one of ordinary skill in the art, without departing from the spirit and scope of this invention.

The ultrasonic transmitter 58 contains a transducer for generating an ultrasonic wave. Such a transducer is generally known to provide a 3-D beam pattern having a large amount of lateral energy, thereby enabling "off-axis" reception by a receiver. The exemplary transmitter 50 has been demonstrated to generate a hemispherical beam pattern of approximately 25 feet or more in range. Of course, the beam pattern and range is a function of the transducer type and signal power, all of which, are infinitely variable, depending on the design choices.

The transducer can be of a piezoelectric material having a micro-modulation response of approximately 500 microseconds. A 1% duty cycle is used for transmission in the exemplary transmitter 50 and is based on a random seed, of which can easily be derived from physical tolerances of the internal components of the transmitter 50 or an optional random seed generator. The retransmission rate also includes a latency, thus minimizes the possibility of having two or more badges transmitting at the same time. Combined with the randomness and the latency, collision between multiple transmitters 50 can be reduced to a very low probability.

The transducer operates in principle as a tuning fork or resonant circuit when engaged with a fundamental 40 kHz signal. Using a high precision crystal 54, a 40 kHz signal can be generated with a 1.6% modulation (i.e., 644 Hz deviation). The very slight modulation factor can be considered as a micromodulation of the fundamental frequency. The transducer used in the exemplary transmitter 50 takes approximately 500 microseconds or 20 cycles at 40 kHz to deviate its output frequency from 40 kHz to 40.644 kHz. Having, for example, a bit stream of 16 bits and 4 bits for checksum, micro-modulation enables the transmission of the 20 bits within 10 milliseconds (e.g., 20×500 microseconds). With the 20 bits transmitted once per second, resulting in a duty cycle of 1%, up to 100 or transmitters can be used in the same location without time interference. The short transmission time of the code also minimizes interference caused by signal echo, thereby enabling receivers to be installed as near as 3 feet from a reflecting surface.

Figure 3:
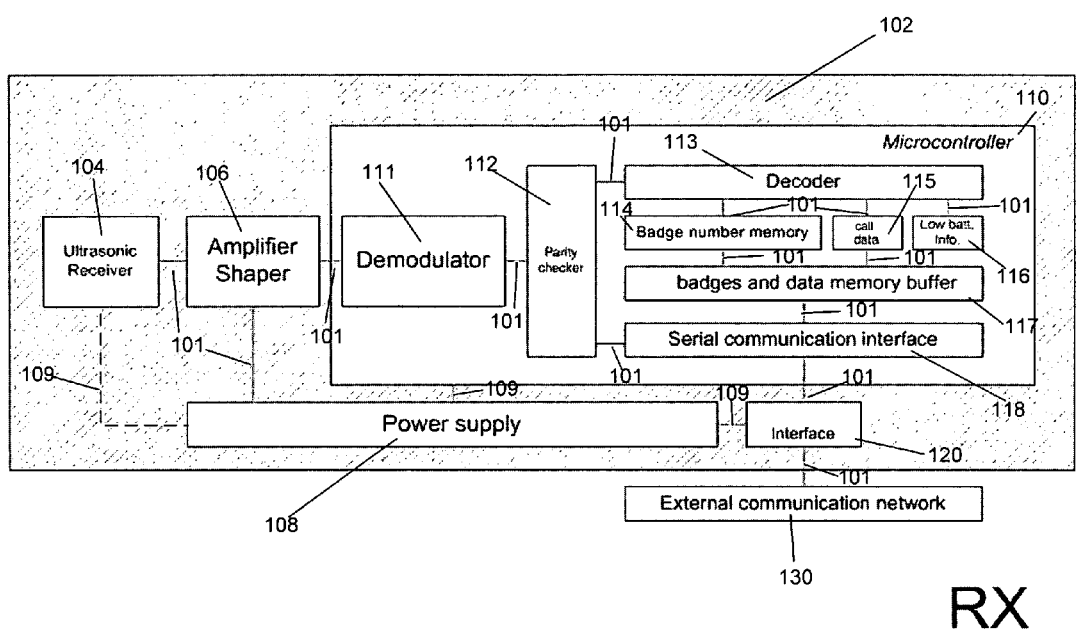
FIG. 3 is a block diagram of an exemplary receiver.

FIG. 3 is a block diagram of an exemplary receiver 100. The exemplary receiver 100 comprises an arbitrarily shaped housing 102 for housing an ultrasonic receiver 104, an amplifier 106, a power supply 108, a microcontroller 110, and an interface module 120. The interface 120 facilitates communication from the exemplary receiver 100 to an external communication network 130.

In operation, the exemplary receiver 100 detects and receives an ultrasonic signal transmitted by a transmitter such as the exemplary transmitter 50 of FIG. 2. The exemplary receiver 100 may operate in a continuous receive mode, detecting the 40 KHz transmitted signal. Upon detection, the ultrasonic receiver 104 converts the ultrasonic signal into an electrical signal which is transferred to the amplifier 106 via signal line 101. The amplifier 106 amplifies the received signal using power from the power supply 108. The ultrasonic receiver 104 may operate as a passive device or, optionally as an active device, being powered by tapping the amplifier 106 or via optional line 109 to the power supply 108. The amplified signal from the amplifier 106 maybe further modified for conditioning, DSP, etc., according to the choice of the amplifier 106 used. The amplified signal is thereafter conveyed from the amplifier 106 to the microcontroller 110 for frequency demodulation.

The microcontroller 110 contains a demodulator 111 which demodulates the amplified signal and recovers the encoded signal. The demodulated signal is forwarded on to a parity checker 112 which checks for parity or corruption errors in the received signal. If the signal is not corrupted the signal is forwarded onto the decoder 113 which parses the demodulated signal into its badge number, call button, and low battery components. If, however, the parity checker 112 determines that the signal is corrupted or otherwise unusable for decoding, the parity checker 112 ignores the signal and returns the exemplary receiver 100 to an initial detection state, or sends a status update to the serial communication interface 118 for statistical or error handling.

The parsed information from the decoder 113 is forwarded via lines 101 onto its respective memory/data areas (e.g., badge number memory 114, call button memory 115, and low battery memory 116) and then onto the badge and data memory buffer 117. The badge number and call button data is then forwarded via line 101 from the badge and data memory buffer 117 to the serial communication interface 118. The serial communication interface 118 facilitates communication of the decoded information to the interface module 120. The interface module 120 provides appropriate signal levels for communication with an external communication network 130.

The exemplary receiver 100 is a real time frequency measurement system that is designed to receive a transmitted 40 kHz range acoustic signal with very high precision. The receiver 100 can take measurements within a 40 kHz range time cycle. For example, the master clock of the receiver 100 can be preset to 80 MHz clock resulting in a 12.5 micro second window. For a 40 kHz signal, one cycle is equivalent to 25 micro seconds. Accordingly, within 25 micro seconds (corresponding to the 40,000 Hz clock) 2000 time counts of the receiver 100 master clock and 1968 counts (for the 24.6 micro seconds of a 40.644 kHz signal) of the receiver 100 master clock are available. Accordingly, in excess of 32 counts are available to evaluate the difference between the two frequencies.

Figure 4:
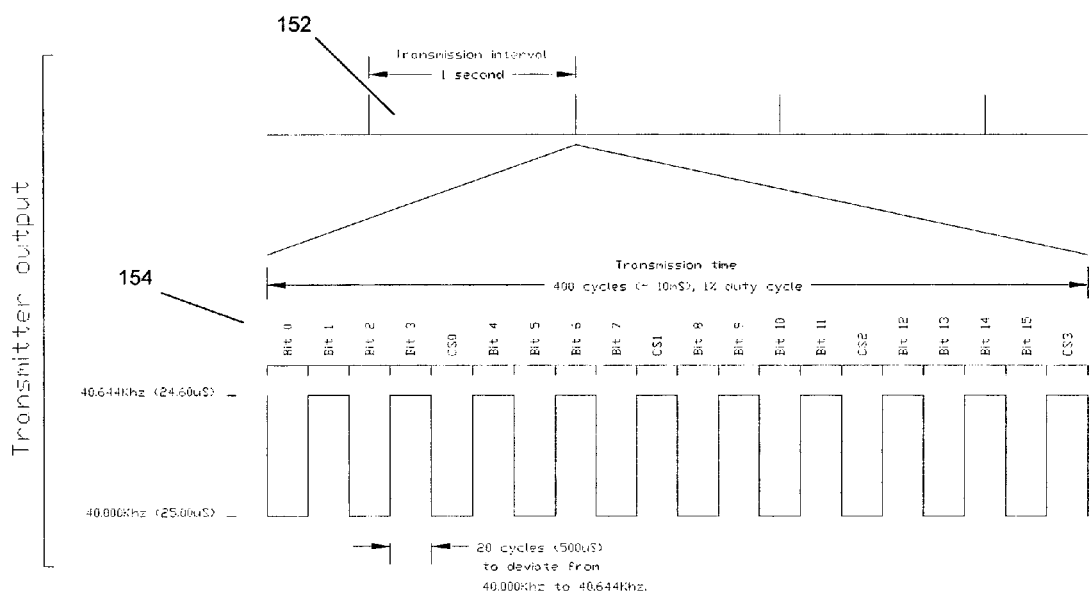
FIG. 4 is an exemplary timing diagram.

FIG. 4 is an exemplary timing diagram 150. The exemplary timing diagram 150 illustrates the relative timing for the transmitter output with respect to the receiver input. Within a 1 second time window 152, an exemplary transmitter 50 of FIG. 2 will transmit with a 1 percent duty cycle having approximately 400 cycles. Presuming a 16 bit data word for encoding the badge number and 4 checksum bits, 20 bits of information can be transmitted therein. The encoded bits 15 are shown having 16 bits 0-15, and 4 checksum bits CS0-3. A binary representation of the data bits is understood to be frequency modulated, the frequency modulations being 40.000 kHz and 40.644 kHz, respectively. By using a high precision crystal controlled oscillator (200 PPM) to generate a 40 Khz signal with an approximate 1.6% modulation (644 Hz deviation) minimal impact on the natural frequency is experienced as is understood here as a form of micro-modulation.

Figure 5:
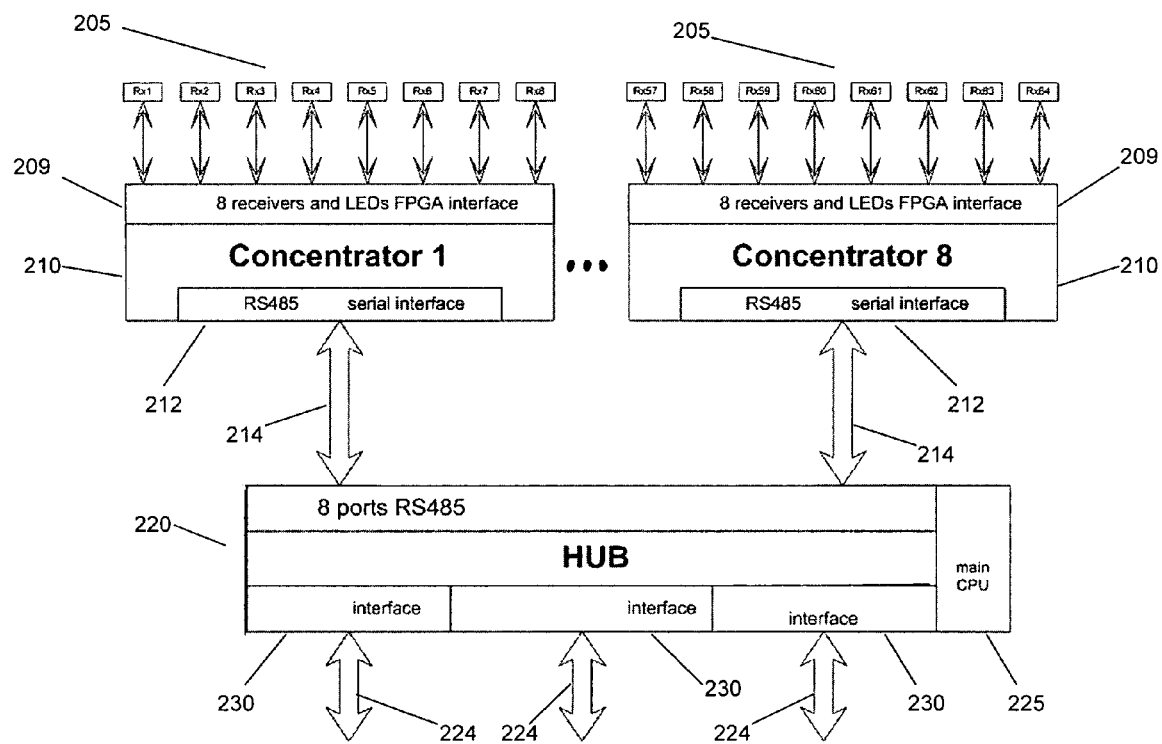
FIG. 5 illustrates an exemplary hub/central level configuration.

FIG. 5 illustrates an exemplary hub/central level arrangement 200. The exemplary arrangement 200 provides a means for forwarding received signals from an array of receivers 100 of FIG. 3 to a central device. The exemplary arrangement 200 contains signal concentrators 210 connected to a hub 220 via signal lines 214. The exemplary concentrator 210 has a receiver interface 209 for receiving and transmitting signals to assorted receivers 205. The exemplary concentrators 210 utilize Field Programmable Gate Arrays (FPGAs) such as, for example, Xilinxs receivers 205 as the front end of the receiver interface 209. The signal concentrators 210 transmit the received signals (for example by wire or wireless) to the hub 220 via RS485 Serial Interfaces 212. In the exemplary system 200, up to 8 concentrators 210 can be arrayed for communication to the hub 220 via the signal lines 214 and the concentrator-side hub interface 212. In the exemplary hub 220 a CPU 225 operates to process the received signals from the signal lines 214. A suite of user and/or peripheral interfaces 230 are provided on the hub 220 to enable communication to external systems or to connect to other hub interfaces via communications lines 224. Accordingly, more than one server can be linked together to allow multi-site systems to be managed.

It should be appreciated that other interface systems or elements may be used or substituted, according to design preference. That is, other devices, vendors or processing systems such as, for example, Hitachi, CISCO, Intel, Motorola, etc., may be implemented that provide similar or enhanced functionalities as the CPU 525. Therefore, while the various systems and elements of the exemplary embodiments described herein may specify a particular device, configuration, or vendors, alternative configurations, vendors, devices, implementations, etc. may be used without departing from the spirit and scope of the invention.

Figure 6:
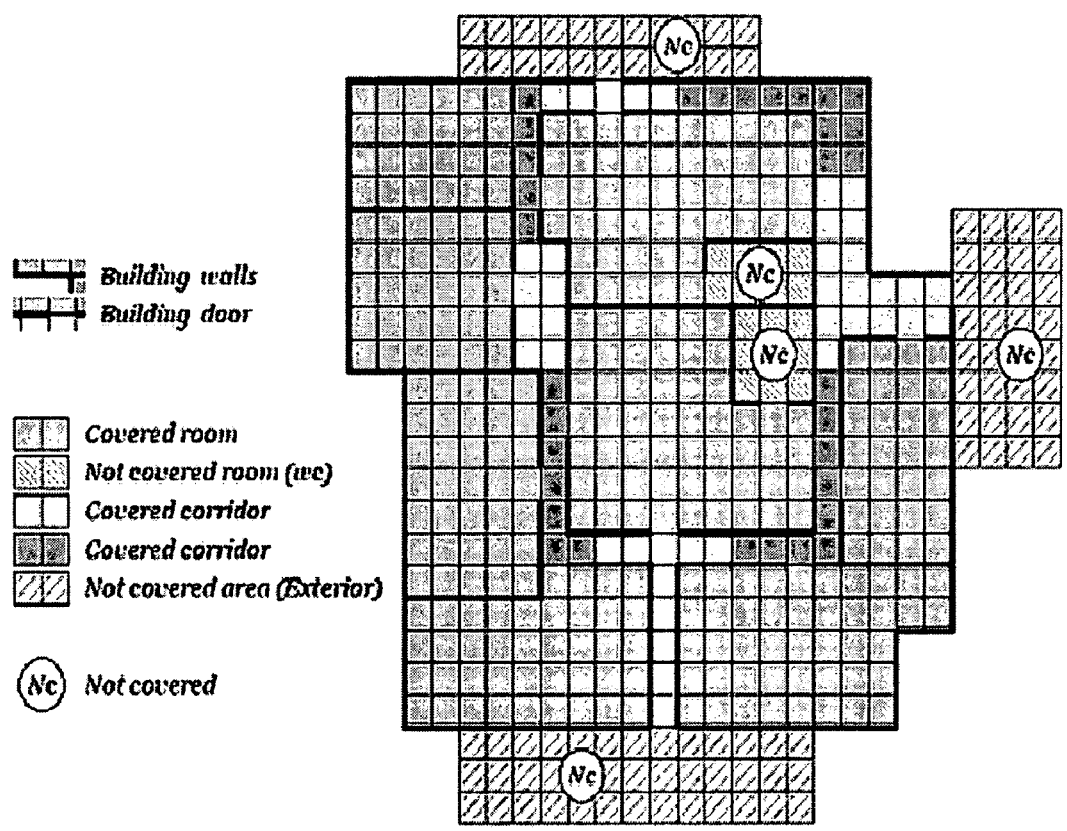
FIG. 6 is an illustration of boundaries suitable for an exemplary spatial filtering algorithm.

FIG. 6 illustrates a graphical representation of respective boundaries 200 recognized by an exemplary spatial algorithm. In general, any mobile element of a locating/tracking system can be any where at a given time. But the number of possibilities that mobile elements can move around is very limited and that number is determined by the spatial configuration of the building. As long as the speed of which the mobile elements are moving is lower than the tracking response time of the system, it is possible to create a spatial filter based on the fact that any element mobile can not be at two places at any given time, and all possible routes to move between spaces are known.

A goal of the spatial filtering algorithm is to provide a maze deduction scheme that closely represents the physical configuration of the building. This configuration is essentially the list of all rooms and the contiguousness between the rooms. This means that all doors and/or passages that are capable as acting as gateways between rooms must be listed.

In order to describe how the exemplary filtering algorithm operates, three elements need to be defined: internal area, external area and maze. An internal area is generally a room inside the building that can be associated with one or more fixed receivers to define an area of coverage. When an internal area is not associated with any receiver, the area is understood to be not covered by the system. An external area is usually outside the tracking area (e.g., building) or invisible or if inside the tracking area indeterminant within the system. Such an area is defined as outside the boundaries of the system. Finally, the maze defines all possible gateways between areas which are contiguous.

The use of a spatial filter avoids common problems within current locating/technologies. For example, instantaneous movements over large distances (for example, teleportation) usually is caused by receiving a false transmission or invalid. Understanding that teleportation cannot occur helps to distinguish false transmissions from valid transmissions. When the system loses track of a mobile element and the last location is known to be adjacent to an external area or to an internal invisible area, the system can assume with a high degree of probability that the mobile element left the building or now is within an internal area that is not covered by the system. Additionally, if the system loses track of a mobile element and no external or uncovered areas are adjacent to the last known location, then an alarm can be generated to signal that this is an abnormal situation. This may happen, for example, if the person wearing the transmitter falls or there is a power or operational failure within the system.

Based on the above, the spatial algorithm can differentiate locations on a three level approach. That is, the first level of the algorithm handles the tracking/locating based on the maze representation of the physical configuration of the location environment (e.g., building). The spatial algorithm within this level can also determine using a process of elimination or last correlated detection which mobile element is closer to a given location when it needs to. The second level handles a transitional movement between internal covered areas and external area and/or internal invisible areas. Finally, the third level handles abnormal situations if the system loses track of a mobile element.

It should be appreciated that improvements in location precision can be obtained by using a plurality of receivers within a room to enable triangulation. Additionally, a secondary transmission scheme such as radio frequency can be used as a master time stamp to better determine latency between ultrasonic receivers. Although the utilization of radio frequency can be taxing on the power consumption of the sensors, it would enable hand shaking between the transmitting devices and the server. For example, the server could poll the transmitting devices using the RF link, thereby requesting an answer via the ultrasonic link. Another example would be to have a confirmation sent to the transmitting device using the RF link whenever the transmitting device has generated an emergency call. Additionally, the RF link could be used as an emergency alarm, if needed. By incorporating the ultrasonic system with an optional RF capability, battery life on the transmitters can be extended up to ten times over conventional systems which rely solely on an RF transmitter.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An ultrasonic transmitter capable of functioning as an electronic badge, the ultrasonic transmitter comprising:
    a frequency oscillator operating at an ultrasonic frequency;
    a microcontroller assembly having an encoder capable of encoding a predetermined value, a serializer capable of serializing the encoded value, a parity encoder between the encoder and the serializer, and a micro-modulator capable of micro-modulating the serialized encoded value using the ultrasonic frequency; and
    an ultrasonic transducer capable of transmitting the encoded value as a micro-modulated ultrasonic signal.

2. The ultrasonic transmitter according to claim 1, further comprising:
    an operational status indicator.

3. The ultrasonic transmitter according to claim 1, wherein the encoder has a separate memory area capable of storing rewritable predetermined values.

4. The ultrasonic transmitter according to claim 1, further comprising:
    configurable encoder operation switches.

5. The ultrasonic transmitter according to claim 1, further comprising a low battery detector.

6. The ultrasonic transmitter according to claim 1, wherein the oscillator is designed to operate at an approximate frequency of 40 KHz.

7. The ultrasonic transmitter according to claim 1, wherein the micro-modulator shifts the ultrasonic frequency by more than 1.6%.

8. The ultrasonic transmitter according to claim 1, wherein the transmitter is wearable.

9. The ultrasonic transmitter according to claim 1, wherein the transmitted signal is randomly transmitted.

10. The ultrasonic transmitter according to claim 1, wherein the predetermined value is serialized into 16 bits.

11. The ultrasonic transmitter according to claim 1, further comprising a power source coupled with the ultrasonic transmitter.

12. An ultrasonic locator system, comprising:
a fixed location ultrasonic receiver;
a hub controller capable of receiving signals demodulated by the fixed location ultrasonic receiver;
a system controller coupled to the hub controller; and
an ultrasonic transmitter capable of functioning as an electronic badge, the ultrasonic transmitter including:
an ultrasonic frequency oscillator,
a microcontroller assembly having an encoder capable of encoding a predetermined value,
a serializer capable of serializing the encoded value,
a parity encoder between the encoder and the serializer,
a micro-modulator capable of micro-modulating an ultrasonic frequency of the oscillator with the serialized encoded value, and
an ultrasonic transducer capable of transmitting a micro-modulated ultrasonic signal to the fixed location ultrasonic receiver.

13. The ultrasonic locator system according to claim 12, further comprising:
a data base server coupled to the system controller.

14. The ultrasonic locator system according to claim 12, wherein the system controller is a computer system.

15. The ultrasonic locator system according to claim 12, further comprising a power source coupled with the ultrasonic transmitter.

* * * * *